US010520786B2

(12) United States Patent
Telfer et al.

(10) Patent No.: US 10,520,786 B2
(45) Date of Patent: Dec. 31, 2019

(54) ELECTRODE STRUCTURES FOR ELECTRO-OPTIC DISPLAYS

(71) Applicant: E Ink Corporation, Billerica, MA (US)

(72) Inventors: Stephen J. Telfer, Arlington, MA (US); Peter Carsten Bailey Widger, Nashua, NH (US); Ana L. Lattes, Newton, MA (US); Dan John Lauber, Arlington, MA (US)

(73) Assignee: E Ink Corporation, Billerica, MA (US)

( * ) Notice: Subject to any disclaimer, the term of this patent is extended or adjusted under 35 U.S.C. 154(b) by 158 days.

(21) Appl. No.: 15/639,258

(22) Filed: Jun. 30, 2017

(65) Prior Publication Data

US 2017/0299938 A1  Oct. 19, 2017

Related U.S. Application Data

(62) Division of application No. 14/152,067, filed on Jan. 10, 2014, now Pat. No. 9,726,957.
(Continued)

(51) Int. Cl.
*G02F 1/167* (2019.01)
*G02B 26/00* (2006.01)
(Continued)

(52) U.S. Cl.
CPC ............. *G02F 1/167* (2013.01); *G02B 5/201* (2013.01); *G02B 26/00* (2013.01); *G02B 26/005* (2013.01);
(Continued)

(58) Field of Classification Search
CPC .. G02F 1/167; G02F 1/155; G02F 2001/1672; G02F 2001/1676;
(Continued)

(56) References Cited

U.S. PATENT DOCUMENTS

| 4,418,346 A | 11/1983 | Batchelder |
| 5,760,761 A | 6/1998 | Sheridon |

(Continued)

FOREIGN PATENT DOCUMENTS

| EP | 1099207 | 5/2001 |
| EP | 1145072 | 10/2001 |

(Continued)

OTHER PUBLICATIONS

Wood, D., "An Electrochromic Renaissance?" Information Display, 18(3), 24 (Mar. 2002) Mar. 1, 2002.
(Continued)

*Primary Examiner* — Stephone B Allen
*Assistant Examiner* — Rahman Abdur
(74) *Attorney, Agent, or Firm* — Brian D. Bean

(57) ABSTRACT

An electro-optic display having a viewing surface through which a user views the display, a bistable, non-electrochromic electro-optic medium, and at least one electrode arranged to apply an electric field to the electro-optic medium, the display further comprising at least 10 micromoles per square meter of the viewing surface of at least one compound having an oxidation potential more negative that about 150 mV with respect to a standard hydrogen electrode,
(Continued)

as measured at pH 8, where the compound having the oxidation potential comprises one or more compounds of Formulae I below:

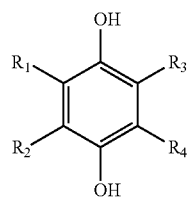

where in Formulae I, $R_1$-$R_4$ may be substituted or unsubstituted alkyl or aryl groups, or heteroatomic groups containing hetero atoms of Groups V-VII of the periodic table, and substituents $R_1$ and $R_2$ (taken together), and/or $R_3$ and $R_4$, may form a ring.

16 Claims, 5 Drawing Sheets

Related U.S. Application Data

(60) Provisional application No. 61/750,980, filed on Jan. 10, 2013.

(51) Int. Cl.
| | | |
|---|---|---|
| *G02B 5/20* | (2006.01) | |
| *G02B 26/02* | (2006.01) | |
| *G02F 1/155* | (2006.01) | |
| *G02F 1/1676* | (2019.01) | |
| *G02F 1/1681* | (2019.01) | |
| *G02F 1/1675* | (2019.01) | |

(52) U.S. Cl.
CPC .......... *G02B 26/026* (2013.01); *G02F 1/155* (2013.01); *G02F 1/1676* (2019.01); *G02F 1/1681* (2019.01); *G02F 2001/1678* (2013.01)

(58) Field of Classification Search
CPC .......... G02F 2001/1678; G02F 1/1681; G02B 5/201; G02B 26/005; G02B 26/026; G02B 26/00
USPC ........................ 359/296, 245, 315
See application file for complete search history.

(56) References Cited

U.S. PATENT DOCUMENTS

| | | |
|---|---|---|
| 5,777,782 A | 7/1998 | Sheridon |
| 5,808,783 A | 9/1998 | Crowley |
| 5,872,552 A | 2/1999 | Gordon, II |
| 6,054,071 A | 4/2000 | Mikkelsen, Jr. |
| 6,055,091 A | 4/2000 | Sheridon |
| 6,097,531 A | 8/2000 | Sheridon |
| 6,124,851 A | 9/2000 | Jacobson |
| 6,128,124 A | 10/2000 | Silverman |
| 6,130,773 A | 10/2000 | Jacobson |
| 6,130,774 A | 10/2000 | Albert |
| 6,137,467 A | 10/2000 | Sheridon |
| 6,144,361 A | 11/2000 | Gordon, II |
| 6,147,791 A | 11/2000 | Sheridon |
| 6,172,798 B1 | 1/2001 | Albert |
| 6,177,921 B1 | 1/2001 | Comiskey |
| 6,184,856 B1 | 2/2001 | Gordon, II |
| 6,225,971 B1 | 5/2001 | Gordon, II |
| 6,232,950 B1 | 5/2001 | Albert |
| 6,241,921 B1 | 6/2001 | Jacobson |
| 6,252,564 B1 | 6/2001 | Albert |
| 6,271,823 B1 | 8/2001 | Gordon, II |
| 6,301,038 B1 | 10/2001 | Fitzmaurice |
| 6,312,304 B1 | 11/2001 | Duthaler |
| 6,312,971 B1 | 11/2001 | Amundson |
| 6,376,828 B1 | 4/2002 | Comiskey |
| 6,392,786 B1 | 5/2002 | Albert |
| 6,413,790 B1 | 7/2002 | Duthaler |
| 6,422,687 B1 | 7/2002 | Jacobson |
| 6,445,374 B2 | 9/2002 | Albert |
| 6,480,182 B2 | 11/2002 | Turner |
| 6,498,114 B1 | 12/2002 | Amundson |
| 6,506,438 B2 | 1/2003 | Duthaler |
| 6,518,949 B2 | 2/2003 | Drzaic |
| 6,521,489 B2 | 2/2003 | Duthaler et al. |
| 6,535,197 B1 | 3/2003 | Comiskey |
| 6,545,291 B1 | 4/2003 | Amundson |
| 6,639,578 B1 | 10/2003 | Comiskey |
| 6,657,772 B2 | 12/2003 | Loxley |
| 6,664,944 B1 | 12/2003 | Albert |
| D485,294 S | 1/2004 | Albert |
| 6,672,921 B1 | 1/2004 | Liang |
| 6,680,725 B1 | 1/2004 | Jacobson |
| 6,683,333 B2 | 1/2004 | Kazlas |
| 6,724,519 B1 | 4/2004 | Comiskey |
| 6,750,473 B2 | 6/2004 | Amundson |
| 6,788,449 B2 | 9/2004 | Liang |
| 6,816,147 B2 | 11/2004 | Albert |
| 6,819,471 B2 | 11/2004 | Amundson |
| 6,822,782 B2 | 11/2004 | Honeyman |
| 6,825,068 B2 | 11/2004 | Denis |
| 6,831,769 B2 | 12/2004 | Holman |
| 6,842,167 B2 | 1/2005 | Albert |
| 6,842,279 B2 | 1/2005 | Amundson |
| 6,842,657 B1 | 1/2005 | Drzaic |
| 6,865,010 B2 | 3/2005 | Duthaler et al. |
| 6,866,760 B2 | 3/2005 | Paolini, Jr. |
| 6,870,657 B1 | 3/2005 | Fitzmaurice |
| 6,922,276 B2 | 7/2005 | Zhang et al. |
| 6,950,220 B2 | 9/2005 | Abramson et al. |
| 6,967,640 B2 | 11/2005 | Albert et al. |
| 6,980,196 B1 | 12/2005 | Turner et al. |
| 6,982,178 B2 * | 1/2006 | LeCain ............... G02F 1/167 438/22 |
| 7,002,728 B2 | 2/2006 | Pullen et al. |
| 7,012,600 B2 | 3/2006 | Zehner |
| 7,012,735 B2 | 3/2006 | Honeyman et al. |
| 7,030,412 B2 | 4/2006 | Drzaic et al. |
| 7,075,502 B1 | 7/2006 | Drzaic |
| 7,075,703 B2 | 7/2006 | O'Neil et al. |
| 7,106,296 B1 | 9/2006 | Jacobson |
| 7,110,163 B2 | 9/2006 | Webber et al. |
| 7,116,318 B2 | 10/2006 | Amundson et al. |
| 7,119,772 B2 | 10/2006 | Amundson |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,206,119 B2 | 4/2007 | Honeyman et al. |
| 7,223,672 B2 | 5/2007 | Kazlas et al. |
| 7,230,751 B2 | 6/2007 | Whitesides et al. |
| 7,236,291 B2 | 6/2007 | Kaga et al. |
| 7,256,766 B2 | 8/2007 | Albert et al. |
| 7,259,744 B2 | 8/2007 | Arango |
| 7,280,094 B2 | 10/2007 | Albert |
| 7,312,784 B2 | 12/2007 | Baucom et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,342,068 B2 | 3/2008 | Klingenberg |
| 7,349,148 B2 | 3/2008 | Doshi et al. |
| 7,352,353 B2 | 4/2008 | Albert |
| 7,365,394 B2 | 4/2008 | Denis et al. |
| 7,365,733 B2 | 4/2008 | Duthaler |
| 7,382,363 B2 | 6/2008 | Albert et al. |
| 7,388,572 B2 | 6/2008 | Duthaler et al. |

(56) References Cited

U.S. PATENT DOCUMENTS

| | | |
|---|---|---|
| 7,411,719 B2 | 8/2008 | Paolini, Jr. et al. |
| 7,420,549 B2 | 9/2008 | Jacobson |
| 7,442,587 B2 | 10/2008 | Amundson et al. |
| 7,453,445 B2 | 11/2008 | Amundson |
| 7,492,497 B2 | 2/2009 | Paolini, Jr. |
| 7,535,624 B2 | 5/2009 | Amundson et al. |
| 7,551,346 B2 | 6/2009 | Fazel |
| 7,554,712 B2 | 6/2009 | Patry et al. |
| 7,561,324 B2 | 7/2009 | Duthaler et al. |
| 7,564,614 B2 | 7/2009 | Chen |
| 7,583,427 B2 | 9/2009 | Danner |
| 7,598,173 B2 | 10/2009 | Ritenour |
| 7,605,799 B2 | 10/2009 | Amundson et al. |
| 7,636,191 B2 | 12/2009 | Duthaler |
| 7,649,674 B2 | 1/2010 | Danner |
| 7,667,886 B2 | 2/2010 | Danner |
| 7,670,505 B2 | 3/2010 | Enger et al. |
| 7,672,040 B2 | 3/2010 | Sohn |
| 7,679,814 B2 | 3/2010 | Paolini, Jr. et al. |
| 7,688,497 B2 | 3/2010 | Danner |
| 7,733,335 B2 | 6/2010 | Zehner |
| 7,785,988 B2 | 8/2010 | Amundson |
| 7,787,169 B2 | 8/2010 | Abramson et al. |
| 7,839,564 B2 | 11/2010 | Whitesides et al. |
| 7,843,624 B2 | 11/2010 | Danner |
| 7,843,626 B2 | 11/2010 | Amundson et al. |
| 7,859,637 B2 | 12/2010 | Amundson et al. |
| 7,893,435 B2 | 2/2011 | Kazlas et al. |
| 7,898,717 B2 | 3/2011 | Patry, Jr. |
| 7,957,053 B2 | 6/2011 | Honeyman |
| 7,986,450 B2 | 7/2011 | Cao |
| 8,009,344 B2 | 8/2011 | Danner |
| 8,009,348 B2 | 8/2011 | Zehner |
| 8,027,081 B2 | 9/2011 | Danner |
| 8,040,594 B2 | 10/2011 | Paolini, Jr. |
| 8,049,947 B2 | 11/2011 | Danner |
| 8,077,141 B2 | 12/2011 | Duthaler |
| 8,089,453 B2 | 1/2012 | Comiskey |
| 8,098,418 B2 | 1/2012 | Paolini, Jr. |
| 8,208,193 B2 | 6/2012 | Patry, Jr. |
| 8,319,759 B2 | 11/2012 | Jacobson |
| 8,373,211 B2 | 2/2013 | Amundson |
| 8,389,381 B2 | 3/2013 | Amundson |
| 8,498,042 B2 | 7/2013 | Danner |
| 8,547,628 B2 | 10/2013 | Wu |
| 8,610,988 B2 | 12/2013 | Zehner et al. |
| 8,728,266 B2 | 5/2014 | Danner |
| 8,754,859 B2 | 6/2014 | Gates |
| 8,830,560 B2 | 9/2014 | Danner |
| 8,891,155 B2 | 11/2014 | Danner |
| 9,152,003 B2 | 10/2015 | Danner |
| 9,152,004 B2 | 10/2015 | Paolini, Jr. |
| 9,199,441 B2 | 12/2015 | Danner |
| 2002/0060321 A1 | 5/2002 | Kazlas |
| 2004/0105036 A1 | 6/2004 | Danner et al. |
| 2005/0122306 A1 | 6/2005 | Wilcox et al. |
| 2005/0122563 A1 | 6/2005 | Honeyman et al. |
| 2005/0152018 A1* | 7/2005 | Abramson ............... G02F 1/15 |
| | | 359/265 |
| 2006/0131567 A1 | 6/2006 | Liu |
| 2007/0052757 A1 | 3/2007 | Jacobson |
| 2008/0221289 A1* | 9/2008 | Enger ................. C09K 19/322 |
| | | 526/286 |
| 2009/0122389 A1 | 5/2009 | Whitesides |
| 2009/0315044 A1 | 12/2009 | Amundson |
| 2010/0265561 A1 | 10/2010 | Gates et al. |
| 2011/0026101 A1 | 2/2011 | Wu |
| 2011/0140744 A1 | 6/2011 | Kazlas |
| 2011/0187683 A1 | 8/2011 | Wilcox |
| 2011/0187689 A1 | 8/2011 | Bishop |
| 2011/0292319 A1 | 12/2011 | Cole |
| 2011/0304652 A1 | 12/2011 | Korthuis |
| 2012/0013971 A1* | 1/2012 | Wu ......................... G02F 1/167 |
| | | 359/296 |
| 2012/0293858 A1 | 11/2012 | Telfer |

FOREIGN PATENT DOCUMENTS

| | | | |
|---|---|---|---|
| WO | 2000038000 | 6/2000 | |
| WO | WO-2006120220 A1 * | 11/2006 | ........... C09K 19/322 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

Bach, U. et al., "Nanomaterials-Based Electrochromics for Paper-Quality Displays", Adv. Mater, vol. 14, No. 11, pp. 845-848 (Jun. 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

Korean Intellectual Property Office; PCT/US2014/011077; International Search Report and Written Opinion; May 8, 2014. May 8, 2014.

* cited by examiner

ELECTRODE STRUCTURES FOR ELECTRO-OPTIC DISPLAYS

REFERENCE TO RELATED APPLICATIONS

This application is a divisional application to U.S. patent application Ser. No. 14/152,067 filed on Jan. 10, 2014, where the Ser. No. 14/152,067 application itself claims priority to United Stated Provisional Application No. 61/750,980 filed on Jan. 10, 2013.

The entire contents of these patents and copending application, and of all other U.S. patents and published and copending applications mentioned below, are herein incorporated by reference.

BACKGROUND OF INVENTION

This invention relates to electrode structures. These electrode structures are especially intended for use in electro-optic displays but may also find use in other applications.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

Some electro-optic media are solid in the sense that the materials have solid external surfaces, although the media may, and often do, have internal liquid- or gas-filled spaces. Displays using solid electro-optic media may hereinafter for convenience be referred to as "solid electrophoretic displays".

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,327,511; 7,349,148; 7,352,353; 7,365,394; 7,365,733; 7,382,363; 7,388,572; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,843,626; 7,859,637; 7,893,435; 7,898,717; 7,957,053; 7,986,450; 8,009,344; 8,027,081; 8,049,947; 8,077,141; 8,089,453; 8,208,193; and 8,373,211; and U.S. Patent Applications Publication Nos. 2002/0060321; 2004/0105036; 2005/0122306; 2005/0122563; 2007/0052757; 2007/0097489; 2007/0109219; 2007/0211002; 2009/0122389; 2009/0315044; 2010/0265239; 2011/0026101; 2011/0140744; 2011/0187683; 2011/0187689; 2011/0286082; 2011/0286086; 2011/0292319; 2011/0292493; 2011/0292494; 2011/0297309; 2011/0310459; and 2012/0182599; and International Application Publication No. WO 00/38000; European Patents Nos. 1,099,207 B1 and 1,145,072 B1;

(e) Color formation and color adjustment; see for example U.S. Pat. No. 7,075,502 and U.S. Patent Application Publication No. 2007/0109219;

(f) Methods for driving displays; see for example U.S. Pat. Nos. 7,012,600; 7,119,772; and 7,453,445;

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating, silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982,178, (see column 3, lines 63 to column 5, line 46) many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer, a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer, an adhesive layer, a layer of a solid electro-optic medium; and a release sheet. This inverted front plane laminate is used to form an electro-optic display having a layer of lamination adhesive between the electro-optic layer and the front electrode or front substrate; a second, typically thin, layer of adhesive may or may not be present between the electro-optic layer and a backplane. Such electro-optic displays can combine good resolution with good low temperature performance.

In a high-resolution display, each individual pixel must be addressable without interference from the addressing of adjacent pixels (whether or not the electro-optic medium used is bistable). One way to achieve this objective is to provide an array of non-linear elements, such as transistors or diodes, wherein at least one non-linear element is associated with each pixel, to produce an active matrix display, as mentioned above. An addressing (pixel) electrode, which addresses one pixel, is connected to an appropriate voltage source through its associated non-linear element. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; the assignment of sources to rows and gates to columns is conventional and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner.

In the discussion below, the term "waveform" will be used to denote the entire voltage against time curve used to effect the transition of a pixel from one specific initial gray level to a specific final gray level. Typically such a waveform will comprise a plurality of waveform elements; where these elements are essentially rectangular (i.e., where a given element comprises application of a constant voltage for a period of time); the elements may be called "pulses" or "drive pulses". The term "drive scheme" denotes a set of waveforms sufficient to effect all possible transitions between gray levels for a specific display. A display may make use of more than one drive scheme; for example, U.S. Pat. No. 7,012,600 teaches that a drive scheme may need to be modified depending upon parameters such as the temperature of the display or the time for which it has been in operation during its lifetime, and thus a display may be provided with a plurality of different drive schemes to be used at differing temperature etc. A set of drive schemes used in this manner may be referred to as "a set of related drive schemes."

Prior art front electrodes for use with the electrophoretic and similar electro-optic displays typically comprise a very thin (about 0.1 μm) layer of a ceramic, such as indium tin oxide or a similar mixed metal oxide (see the aforementioned U.S. Pat. No. 6,982,178). This thin layer is normally formed by sputtering the ceramic on to a polymer film, typically poly(ethylene terephthalate). Prior art rear (pixel) electrodes may be formed in a similar manner, or may be formed from thin metal films; the front electrode must of course be light-transmissive to enable the electro-optic layer to be seen, whereas with a reflective electro-optic layer, the rear electrodes can be opaque.

Although ceramic front electrodes have been in large scale commercial use for a many years, they still suffer from a number of mechanical, optical and electrical problems. The tensions and temperatures used during lamination steps in the manufacture of the display may cause the ceramic to crack and form discontinuities in conductivity, leading to poor or inconsistent switching of the display. These cracks are also areas of high water vapor transmission, which may cause local damage to a humidity-sensitive electro-optic medium (many of the aforementioned types of electro-optic media are sensitive to humidity). In color display using color filter arrays (CFA's), it is desirable to reduce parallax problems by bringing the CFA as close as possible to the electro-optic layer using a thin polymeric filmreducing the thickness of the PET substrate on which the ITO is coated. As the PET substrate is made thinner the cracking issues associated with the ITO are accentuated due to the higher thermal shrinkage of the thinner base.

As discussed in detail in the aforementioned U.S. Pat. No. 7,119,772, it has been found desirable for at least some types of electro-optic display that the drive scheme at each pixel location be DC balanced, in the sense that, for any series of transitions beginning and ending at the same gray level, the algebraic sum of the impulses applied during the series of transitions be bounded. It has been found that accurately DC-balanced waveforms (i.e., those in which the integral of current against time for any particular pixel of the display is held to zero over an extended period of operation of the display) are required to preserve image stability, maintain symmetrical switching characteristics, and provide the maximum useful working lifetime in certain displays of the prior art.

It is in general preferred that all individual waveforms within a drive scheme be DC balanced, but in practice this has been difficult to achieve, so typical drive schemes have usually been a mixture of DC balanced and DC imbalanced waveforms, even though the drive scheme as a whole has been DC balanced.

As discussed in the aforementioned U.S. Pat. No. 7,119,772, the extent to which DC-imbalanced driving affects an electrophoretic or other electro-optic display (presumably by polarization of certain display components, as discussed in more detail below) may be ascertained by measuring the open-circuit potential (hereinafter for convenience called the "remnant voltage") of a particular region (say, a pixel) of the display. When the remnant voltage of a pixel is zero, it is taken to be DC balanced. If its remnant voltage is positive, it is taken to be DC unbalanced in the positive direction. If its remnant voltage is negative, it is taken to be DC unbalanced in the negative direction. Non-zero remnant voltages have been found to correlate with difficulties in accurate gray level placement.

The degradation in display performance caused by development of remnant voltage is generally reversible, either by storing the display without further switching or by switching appropriately to rebalance the DC impulses. In cases where a prior art electrophoretic display is driven with extreme degrees of DC-imbalance, however, it is possible that the electrodes may be irreversibly degraded, presumably by electrochemical reactions that consume the electrode materials.

Although DC-balanced driving waveforms effectively protect against development of remnant voltages and electrode degradation there are problems associated with their use. Extra time must be allocated in order to provide balancing impulses, sometimes resulting in update times that are two to three times longer than would be possible with a DC-imbalanced drive. In some electrophoretic compositions the time required for an optical transition from black to white is different from that required from white to black. In a DC-balanced waveform the longer of the two switching times must be used for both transitions. In addition, distracting optical transitions may be visible to the user of the display during DC-balanced updates.

As described for example in U.S. Pat. Nos. 6,724,519 and 7,564,614, corrosion inhibitors may be incorporated into electro-optic displays to prevent damage to electrodes from DC imbalances during driving of the displays. The present invention provides an alternative method of preventing damage to electrodes by incorporating into electro-optic displays materials which permit redox reactions to occur, thus protecting the electrodes.

SUMMARY OF INVENTION

Accordingly, this invention provides an electro-optic display having a viewing surface through which a user views the display, a bistable, non-electrochromic electro-optic medium, and at least one electrode arranged to apply an electric field to the electro-optic medium, the display further comprising at least 10 micromoles per square meter of the viewing surface (or alternatively of the area of the electro-optic medium) of at least one compound (which may hereinafter be referred to as the "redox compound") having an oxidation potential more negative that about 150 mV with respect to a standard hydrogen electrode, as measured at pH 8.

The bistable, non-electrochromic electro-optic medium used in the display of the present invention should normally be one which requires "charge injection" from its electrodes, i.e., it should normally be one which requires ionic conduction through one or more layers lying between the electrodes. In the electro-optic display of the present invention, the electro-optic medium may be an electrophoretic medium comprising a fluid and a plurality of electrically charged particles dispersed in the fluid. The redox compound may be in the form of a polymer provided in a layer disposed between one or more of the electrodes and the layer of electro-optic material.

The redox compound used in the electrophoretic display of the present invention may comprise one or more compounds of Formulae I-VIII below:

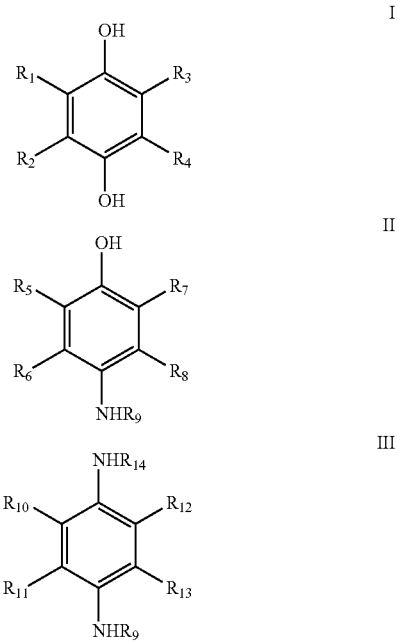

wherein, in Formulae I-III, $R_1$-$R_{15}$ may be substituted or unsubstituted alkyl or aryl groups, or heteroatomic groups containing hetero atoms of Groups V-VII of the periodic table;

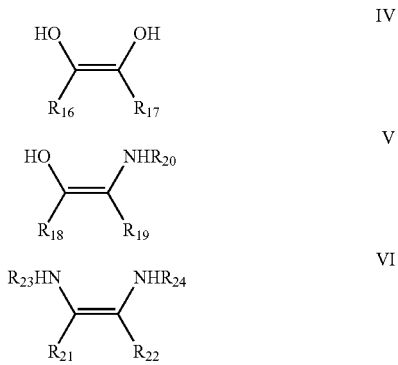

wherein, in Formulae IV-VI, $R_{16}$-$R_{24}$ may be substituted or unsubstituted alkyl or aryl groups, or heteroatomic groups containing hetero atoms of Groups V-VII of the periodic table;

wherein, in Formula VII, $R_{25}$-$R_{28}$ may be substituted or unsubstituted alkyl or aryl groups, or heteroatomic groups containing hetero atoms of Groups V-VII of the periodic table;

VIII wherein, in Formula VIII, $R_{29}$ may be a substituted or unsubstituted alkyl or aryl group or a heterocyclyl or heteroatomic group containing hetero atoms of Groups V-VII of the periodic table. Alternatively or in addition, the redox compound may be any one or more of a phosphite salt, a sulfite salt; or a salt of titanium (III), vanadium (II), iron (II), cobalt (II) or copper (I).

Alternatively, the redox compound may be any one or more compounds selected from the group consisting of hydroquinones, catechols, phenidone and substituted phenidone compounds, dihydropyridines and metallocenes.

The displays of the present invention may be used in any application in which prior art electro-optic displays have been used. Thus, for example, the present displays may be used in electronic book readers, portable computers, tablet computers, cellular telephones, smart cards, signs, watches, shelf labels, variable transmission windows and flash drives.

This invention extends to a front plane laminate or inverted front plane laminate comprising a redox compound as defined above.

In prior displays, there is no provision for controlled electrochemical reactions to occur at the electrode interfaces (i.e., to allow controlled charge injection from the electrodes). In contrast, in displays of the present invention, redox compounds are incorporated in layers adjacent the electrodes (or are incorporated into the displays in ways which permit them to diffuse adjacent the electrodes), thus permitting controlled electrochemical reactions to occur. Such electrochemical reactions may be reversible, partially reversible, or irreversible, and serve two purposes, namely to decrease the remnant voltage observed with DC-imbalanced driving, and to protect the electrode materials from irreversible degradation. With the addition of these redox compounds, DC-imbalanced driving can be effected without incurring an objectionable level of reversible or irreversible damage to the display.

DETAILED DESCRIPTION

Figure 1:
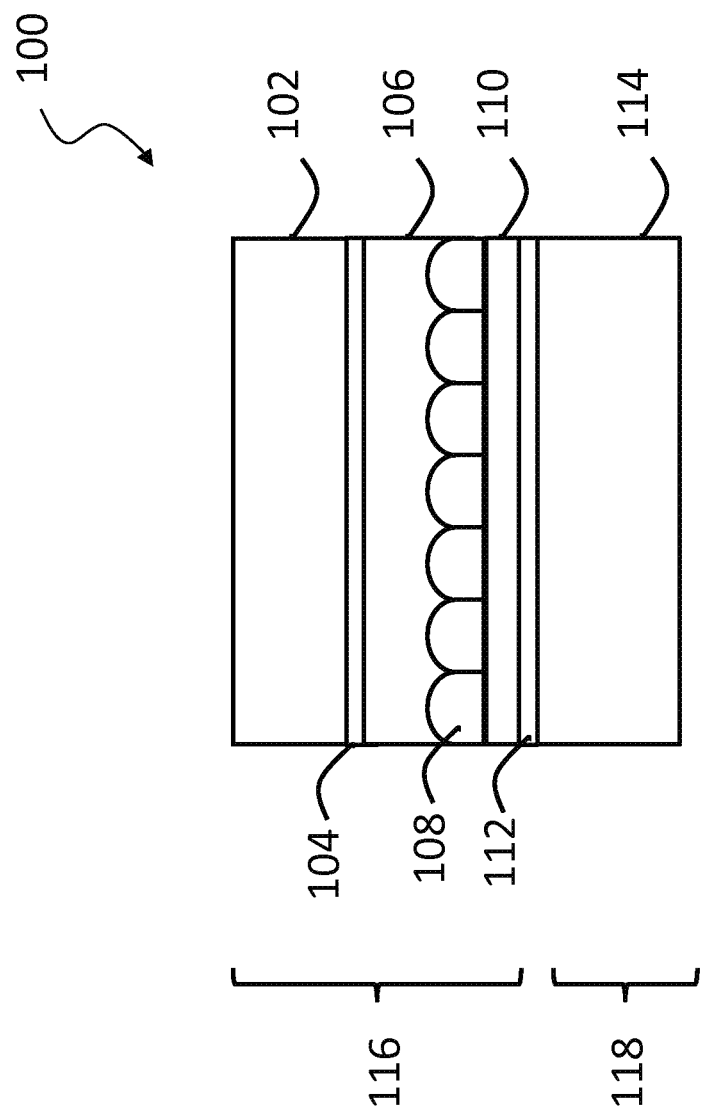
FIG. 1 is a schematic cross-section through an electrophoretic display of the invention.

FIG. 1 shows a schematic cross-section through an encapsulated electrophoretic display 100, which may as described in, for example, the aforementioned U.S. Pat. No. 6,982,178. The display 100 comprises a light-transmissive substrate 102 that conveniently has the form of a transparent plastic film, such as a sheet of poly(ethylene terephthalate) (PET) between 25 and 200 μm in thickness. Although not shown in FIG. 1, the substrate 102 (the upper surface of which, as illustrated in FIG. 1, forms the viewing surface of the display) may comprise one or more additional layers, for example a protective layer to absorb ultra-violet radiation, barrier layers to prevent ingress of oxygen or moisture into the display, and anti-reflection coatings to improve the optical properties of the display.

The substrate 102 carries a thin, light-transmissive, electrically-conductive layer 104 that acts as the front electrode of the display. Layer 104 may comprise a continuous coating of electrically-conductive material with minimal intrinsic absorption of electromagnetic radiation in the visible spectral range such as indium tin oxide (ITO), poly(3,4-ethylenedioxythiophene) poly(styrenesulfonate) (PEDOT:PSS), graphene or the like, or may be a discontinuous layer of a material such as silver (in the form of, for example, nanowires or printed grids) or carbon (for example in nanotube form) that absorb or reflect visible light but are present at a surface coverage such that the layer as a whole is effectively transparent.

A layer (generally designated 108) of an electro-optic medium is in electrical contact with the conductive layer 104 via a polymeric layer or layers 106 (which may be omitted). The electro-optic layer 108 is preferably an opposite charge, dual particle encapsulated electrophoretic medium of the type described in U.S. Pat. No. 6,822,782, and may comprise a plurality of microcapsules, each of which may comprise a capsule wall containing a hydrocarbon-based liquid in which are suspended negatively charged white particles and positively charged black particles. The microcapsules may be retained within a polymeric binder. Upon application of an electrical field across the layer 108, the white particles move towards the positive electrode and the black particles move towards the negative electrode, so that the layer 108 appears, to an observer viewing the display through the substrate 102, white or black depending upon whether the layer 104 is positive or negative relative to the backplane electrode 112.

Alternatively, layer 108 may be fully encapsulated or comprise sealed micro-cells or micro-cups, or may be non-encapsulated. Layer 108 may comprise particles that move through a liquid solvent or a gas, or particles that rotate within a solvent or a gas, or may modulate light by displacement of a solvent, for example by electro-wetting.

As described for example in U.S. Pat. No. 6,982,178, the display 100 further comprises a layer 110 of lamination adhesive coated over the electro-optic layer 108. The lamination adhesive makes possible the construction of an electro-optic display by combining two subassemblies, namely a backplane 118 that comprises an array of pixel electrodes 112 and an appropriate arrangement of conductors to connect the pixel electrodes to drive circuitry, and a front plane 116 that comprises the substrate 102 bearing the transparent electrode 104, the electro-optic material 108, the lamination adhesive 110 and optional additional components such as polymeric layer or layers 106. To form the final display, the front plane 116 is laminated to the backplane 118 using lamination adhesive 110. The lamination adhesive may be cured thermally or by actinic radiation (for example, by UV curing) or may be uncured.

Since the lamination adhesive 110 is in the electrical path separating the backplane electrodes 112 from the front plane electrode 104 its electrical properties must be carefully tailored. As described in U.S. Pat. No. 7,012,735 the lamination adhesive may comprise, in addition to a polymeric material, an ionic dopant that may be an additive selected from a salt, a polyelectrolyte, a polymer electrolyte, a solid electrolyte, a conductive metal powder, a ferrofluid, a non-reactive solvent, a conductive organic compound, and combinations thereof. The volume resistivities of encapsulated electrophoretic media are typically around $10^{10}$ ohm cm, and the resistivities of other electro-optic media are usually of the same order of magnitude. Accordingly, the volume resistivity of the lamination adhesive is normally around $10^8$ to $10^{12}$ ohm cm at the operating temperature of the display, typically around 20° C.

Polymeric layer 106 may be a lamination adhesive layer with similar properties to those described above with reference to lamination adhesive layer 110, except that, since polymeric layer 106 is adjacent to the non-pixelated, light-transmissive common electrode 104, its electrical conductivity may be higher than that of lamination adhesive layer 110, which is adjacent to the pixelated back plane electrodes 112 and cannot be so conductive as to lead to significant currents flowing from one backplane electrode to its neighbors when they are held at different potentials during switching of the display. When polymeric layer 106 is a lamination adhesive it may be used to affix electro-optic layer 108 to electrode layer 104 during manufacture of the front plane as described in detail in the aforementioned U.S. Pat. No. 6,982,178.

Figure 2:
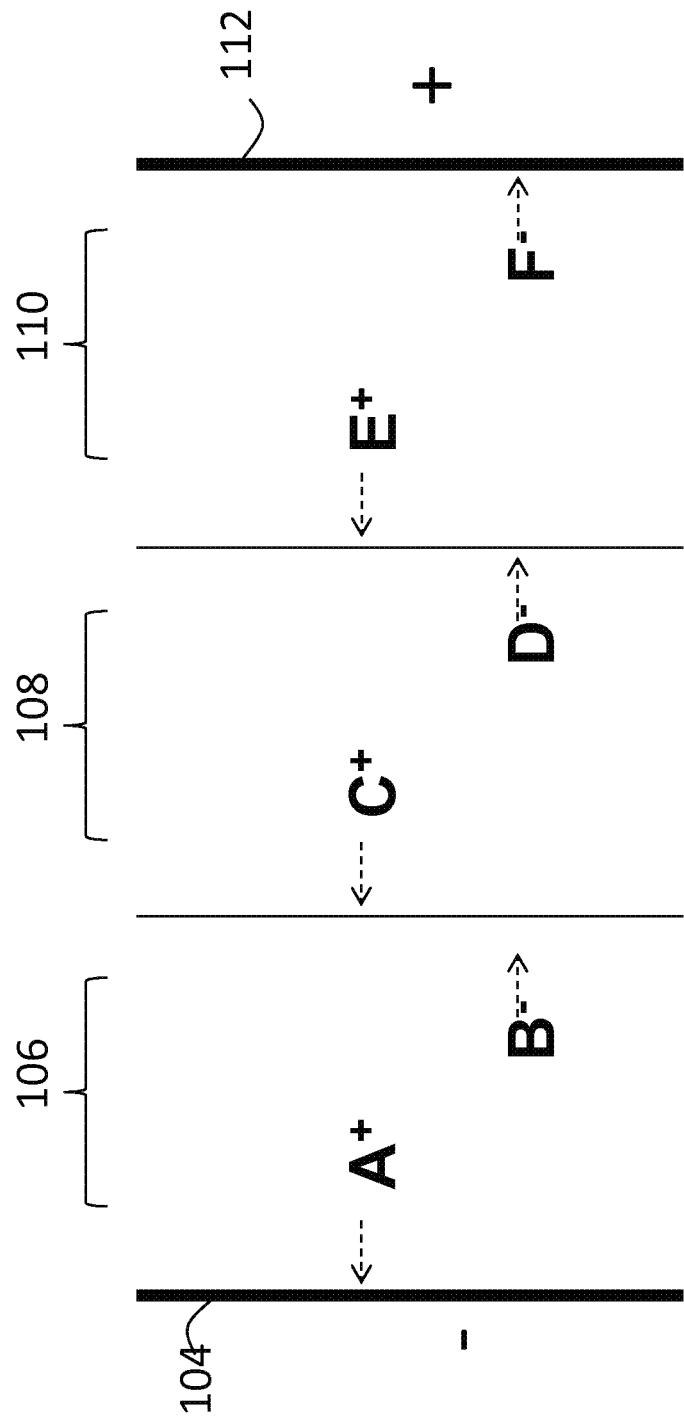
FIGS. 2 and 3 illustrate in simplified form the flux of charged materials that may occur in a display 100 in response to an electric field.

FIG. 2 illustrates in simplified form the flux of charged materials that may occur in display 100 in response to an electric field applied by means of electrodes 104 and 112. For convenience, only polymeric layer 106, electro-optic medium 108 and lamination adhesive 110 are shown, although, as will be clear to one of ordinary skill in the art, other layers are present in the display (for example, if the electro-optic medium 108 is encapsulated, the capsule walls). Mobile charged species in each layer are shown generically as positively-charged species A, C and E, and negatively-charged species B, D and F. Species A and B in polymeric layer 106 could arise, for example, from an ionic dopant added to enhance the conductivity of layer 106 or could be present adventitiously in the materials used to form layer 106. For example, if water is present in layer 106 species A could correspond to a proton arising from ionization of the water. Species A may comprise more than one mobile, cationic species; in this discussion A refers to any mobile, positively-charged species in layer 106. Likewise, species E and F refer to positively- and negatively-charged mobile species in lamination adhesive layer 110. Species C and D refer to mobile, charged entities in the electro-optic medium 108; such entities include charged pigment particles, whose motion changes the optical state of the display, and charged species whose motion has no direct optical effect, such as micellar charges that are well known in the art.

Charged species may cross the boundaries between the various layers of the display. This is shown schematically in FIG. 2, wherein positively-charged species E is shown as crossing the boundary between the lamination adhesive 110 and the electro-optic medium 108 and negatively-charged species B is shown as crossing the boundary between layers 106 and 108. If charged entities are displaced within their respective layers and cannot cross the boundaries between layers, charge will accumulate at the impermeable boundary, being stored as if in an electrolytic capacitor. After the applied electric field is removed and electrodes 104 and 112 are grounded, discharge of the stored charge at boundaries within the display will occur, changing the electric field experienced by the electro-optic layer 108 and potentially changing the optical state of the display.

Even if mobile ionic charges can flow freely across the boundaries between the layers within the display (without accumulating at the internal boundaries), there is still the difficulty that ionic species cannot cross the boundaries between the interior layers of the display and the electrodes 104 and 112. The only likely mechanism for charge transfer across these boundaries is electron transfer, i.e., reduction/oxidation chemical processes. If electron transfer between electrodes 104 and 112 and the interior layers is blocked, ionic charges will inevitably build up at the boundaries between electrode 104 and layer 106 and between layer 110 and electrode 112. If the display is driven with a DC imbalanced drive scheme a substantial charge build-up at these locations may occur. Relaxation of the built-up charge when the electrodes are brought to a common potential may lead to a flow of charge carriers through the electro-optic medium 108. This flow of charge carriers may lead to a change in the optical state of the display.

In practical encapsulated or microcell displays of the prior art, parallel pathways for ionic conduction are provided by the walls of the containers (microcapsules or microcell walls) for the electro-optic material 108, and thresholds of various kinds may be incorporated into electro-optic media so that return currents do not necessarily involve the displacement of pigments. Such thresholds may be provided by incorporation of polymer into the fluid of the electrophoretic medium, as described for example in U.S. Pat. No. 7,170,670. Providing parallel conduction paths, thresholds, or other stabilization mechanisms always results in compromising the performance of the display, however, either in speed or in optical quality. It is therefore desirable to avoid accumulation of charge at electrode boundaries.

More subtle problems may arise in the reproducibility of optical states attained by the display in response to a given electrical impulse if charge displacements induced during the previous history of switching of the display are not completely nullified. Such problems are manifested as "ghosting" in which traces of previously-displayed images are still visible many switching cycles after their original rendering. As discussed in more detail below, charge displacements within layers 106 and 110 may persist for considerable lengths of time.

Figure 3:
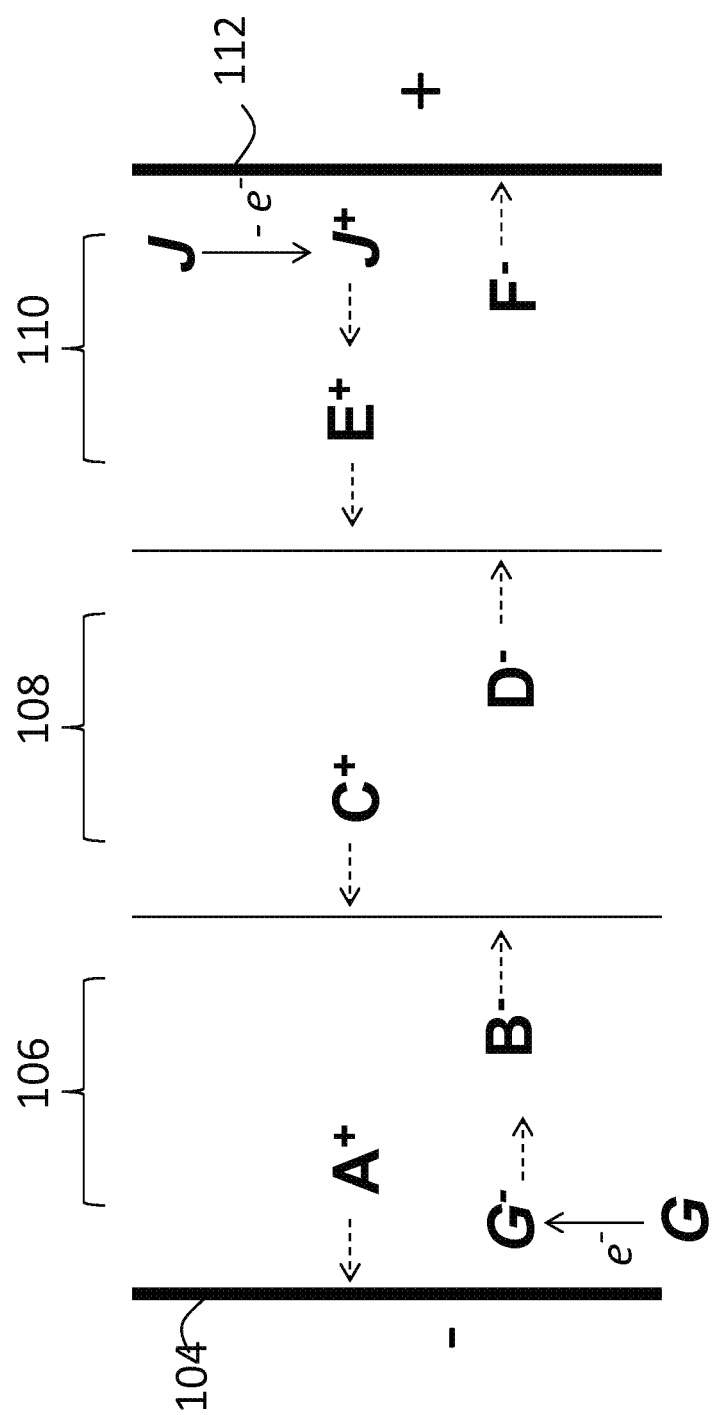

As shown in FIG. 3, in the present invention charge accumulation at electrode interfaces is reduced or eliminated by electrochemical oxidation/reduction reactions involving electron transfer from the electrodes to materials within layers 106 and 110. At the cathode an electron is transferred to reduce a component in the adjacent layer (reduction of neutral species G to provide anion G− is illustrated), while at the anode an electron is transferred to the electrode resulting in oxidation of a component in the adjacent layer (electron transfer from neutral species J to produce cation J+ is shown). The injected charges are of the opposite sign to the charges displaced during initial polarization of the display, and thus the charge buildup at the electrode interfaces is reduced or eliminated.

When a potential is applied to a device such as the display 100 illustrated in FIG. 3, migration of ions towards the electrodes leads to accumulation of charge in thin diffuse layers near the electrodes, the thickness of these layers being of the order of the Debye screening length, as is well known in the electrochemical art. Within these diffuse layers the gradients in electrical potential are very steep. After a certain time, the potential gradient becomes sufficient to cause electron transfer reactions. The ease of electron transfer is determined by, among other things, the redox potentials of the materials present in the vicinity of the electrodes and their concentrations.

Chemical materials that may be used as redox compounds in the displays of the present invention will now be discussed in detail. Such materials find use in other electrochemical devices, for example, batteries, photovoltaic cells, fuel cells, electrochromic display elements, and the like.

In general it is preferred that a redox compound used in the display of the present invention have a reduction potential (of the oxidized form) that is not greater than 1.0 V relative to a standard hydrogen electrode, that the redox material contain at least one carbon atom, and that its molecular weight not exceed 1000 Daltons. Particularly preferred redox compounds have a reduction potential that is not greater than 0.2 V relative to a standard hydrogen electrode, contain at least one carbon atom, and have a molecular weight not exceeding 1000 Daltons. Materials meeting these criteria have been found to be compatible with typical lamination adhesives (i.e., layers 106 and 110 in FIG. 1), to diffuse through the adhesive sufficiently quickly to participate in electrochemical reactions at the electrodes, and to be sufficiently easily oxidized that remnant voltages observed following extended DC-imbalanced driving do not exceed about 1 V.

It is believed (though the invention is in no way limited by this belief) that, in the absence of a redox compound in accordance with the present invention, oxidation of water to form oxygen (a half-cell reaction with a standard reduction potential of more than 1 V) may occur. Because the redox compounds used in the present invention are more easily reduced than water, when such redox compounds are present less ionic polarization is required to produce a sufficiently steep potential gradient in the electrode double layer for electron transfer to take place, and the remnant voltage experienced by the electro-optic material is consequently lower.

In some preferred embodiments of the present invention a mixture of oxidized and reduced forms of a redox material is used; in other embodiments it may be sufficient to use only the reduced form, in which case it is thought that the corresponding reduction reaction at the second electrode may involve an adventitious material present in the display, possibly a proton arising from water commonly present in polymeric materials.

Specific preferred redox compounds useful in the present invention will now be described. Compounds of Formulae I-III above comprise one preferred class of redox compounds. The oxidation of such materials involves two electrons and results in the liberation of two protons and the formation of a benzoquinone (although, as is well known in the chemical art, single electron reactions resulting in semiquinone structures are also possible). Substituents $R_1$-$R_{15}$ may be substituted or unsubstituted alkyl or aryl groups, or heteroatomic groups containing hetero atoms of Groups V-VII of the periodic table (hereinafter for convenience abbreviated as "heteroatomic groups of Groups V-VII"). Substituents $R_1$ and $R_2$ (taken together), and/or $R_3$ and $R_4$, and/or $R_5$ and $R_6$, and/or $R_7$ and $R_8$, and/or $R_{10}$ and $R_{11}$, and/or $R_{12}$ and $R_{13}$, may form a ring. Particularly preferred materials of this class include tetramethylhydroquinone, trimethylhydroquinone, and 2,4- and 2,5-di-tert-butyl hydroquinone. Particularly preferred materials of this class have substituents at every position $R_1$-$R_4$, or $R_5$-$R_8$, or $R_{10}$-$R_{13}$ which are preferably alkyl or aryl substituents. Such materials are less prone to the formation of colored by-products.

Compounds of Formulae IV-VI above comprise a second preferred class of redox compounds for use in the present invention, this class comprising an unsaturated 1,2-dihydroxy (or a nitrogen-containing equivalent) substructure. Although a cis isomer is illustrated, trans isomers may also be used. Substituents $R_{16}$-$R_{22}$ may be substituted or unsubstituted alkyl, or aryl groups, or heteroatomic groups of Groups V-VII. Substituents $R_{16}$ and $R_{17}$ (taken together), and/or $R_{18}$ and $R_{19}$, and/or $R_{21}$ and $R_{22}$ may form a ring. Particularly preferred materials of this class include ascorbic acid and catechols such as 4,5-di-tert-butyl-1,2-dihydroxybenzene.

Compounds of Formula VII comprise a third preferred class of redox compounds for use in the present invention, this class comprising a hydrazine moiety. In this class, a nitrogen atom is oxidized to a radical cation that may react further (for example, by radical coupling) to eventually liberate a proton. Substituents $R_{25}$-$R_{28}$ may be substituted or unsubstituted alkyl or aryl groups, or heteroatomic groups of Groups V-VII. Substituents $R_{25}$ and $R_{26}$ (taken together), and/or $R_{27}$ and $R_{28}$ may form a ring. Particularly preferred materials of this class include phenidone and related materials.

Compounds of Formula VIII comprise a fourth preferred class of redox compounds, in which two sulfur atoms are oxidized to radical cations that couple to form a disulfide bond and liberate two protons. Substituent $R_{29}$ may be a substituted or unsubstituted alkyl or aryl group, or a heterocyclyl or heteroatomic group of Groups V-VII. A particularly preferred material of this class is 5-mercapto-1-methyltetrazole.

In an electrophoretic display, it is necessary to drive the top plane electrode to either a positive or a negative potential relative to the backplane electrodes without a bias in conductivity. This requirement precludes the use, in the present invention, of redox cascades of decreasing redox potential such as are commonly used in the art to make diodes (such as light-emitting diodes).

As mentioned above, the use of a redox compound in accordance with the present invention is intended to control the build-up of charge in the diffuse layers adjacent to the electrodes. Such a build up of charge is typically a reversible process. The present invention also seeks to control the nature of the Faradaic reactions that occur at the electrode interfaces so as to enable DC imbalanced driving of a display without incurring irreversible electrode damage. Without the use of controlled redox compounds in accordance with the invention, unwanted Faradaic reactions may occur, such as electrolysis of water, leading to the formation of byproducts such as hydrogen and oxygen gas. Even worse, the electrode materials themselves may participate in redox reactions. Many conventional transparent electrode materials are prone to reduction reactions; for example, indium tin oxide (ITO) may be irreversibly reduced to metallic tin (or indium), leading at first to discoloration (yellowing) of the transparent electrodes and eventually to complete failure. PEDOT:PSS may lose its conductivity when reduced. Other materials used as transparent electrodes are prone to oxidation; for example, silver metal nanowires or grids may be readily oxidized to silver cations. The present invention seeks to introduce competitive redox chemistry to allow Faradaic reactions to occur at the electrode interfaces without degradation of the electrodes.

Depending upon the exact materials present in the display, the redox compounds used in the present invention may be added to the display in either their reduced or their oxidized form, or a mixture of the two forms. Also, it may in some cases be desirable to add the oxidized form of one redox compound and the reduced form of a different redox compound. Oxidized forms of the redox compounds are incorporated to prevent undesired reduction of electrodes such as indium tin oxide. In some cases where oxidized and reduced forms of different redox compounds are used, it may be desirable that the standard reduction potential of the oxidized form be less positive than that of the oxidized form of the redox compound added in its reduced form; if this criterion is met, the oxidized and reduced forms will not react with each other.

Specific preferred oxidized forms of redox compounds for use in the present invention include benzoquinone materials of Formula V wherein substituents $R_{11}$-$R_{14}$ are substituted or unsubstituted alkyl, aryl, or heteroatomic groups of Groups V-VII of the periodic table. Substituents $R_{11}$ and $R_{12}$ taken together, or substituents $R_{13}$ and $R_{14}$ taken together, may form a ring. Particularly preferred materials of this type include tetramethylbenzoquinone (also known as duroquinone), trimethylbenzoquinone, and 2,4- and 2,5-di-tert-butyl benzoquinone. Particularly preferred materials of this class have each of the substituents $R_{11}$-$R_{14}$ as alkyl or aryl substituents. Such materials are less prone to the formation of colored by-products.

Preferably, the reduced form of the redox compound used in the present invention should be easily oxidized but it must not, of course, react with oxygen in the air. In addition, the reduced form should have a relatively low molecular weight such that it can diffuse to the electrode sufficiently quickly to undergo oxidation during operation of the display; molecular weights less than 1000 Daltons are preferred in the present invention. The concentration of the reduced form should be such that it is not exhausted during the lifetime of the display. Since electrophoretic displays are driven with driving pulses of both polarities, redox compounds capable of reversible redox reactions are preferred to those undergoing irreversible reactions, but the ability to undergo reversible redox reactions is not an absolute requirement of the invention. It has been found that concentrations of the reduced form of the invention in excess of 10 mmole per square meter of the viewing surface (or of the electro-optic medium) of the display are required in order to avoid premature exhaustion of the redox compound.

The oxidized form of a redox compound used in the present invention should be more easily reduced than the ITO electrode; providing a competing pathway for reduction serves to protect the ITO electrode from irreversible electrochemical degradation. The oxidized form should not, however, be so easily reduced that it thermally oxidizes a reduced form unless such an oxidation produces a new reduced form (i.e., the reduced form corresponding to the oxidized form). For example, a preferred reduced form is phenidone and a preferred oxidized form is tetramethylbenzoquinone. Phenidone might be oxidized by tetramethylbenzoquinone, and one product of this reaction would be tetramethylhydroquinone, which is itself a reduced form useful in the present invention. Thus, if tetramethylbenzoquinone is incorporated into a display in molar excess over phenidone, after complete thermal reaction a mixture of tetramethylbenzoquinone (an oxidized form) and tetramethylhydroquinone (a reduced form) would be present.

EXAMPLES

The following Examples are given, though by way of illustration only, to show details of specific materials and processes useful in the present invention.

Example 1

This Example illustrates the reduction in remnant voltage and electrode damage following DC imbalanced driving of a display of the present invention, as compared with a control display lacking a redox compound.

Experimental displays were prepared as follows:

Part A: Preparation of a Solution of Redox Compounds

An oxidized form of a redox compound (tetramethylbenzoquinone, 370 mg, 2.3 mmole) and a reduced form of a redox compound (phenidone, 190 mg, 1.2 mmole) were added to isopropanol (10 g) and the mixture was sonicated at 35° C. for 15 minutes.

Part B: Preparation of a Lamination Layer (Corresponding to Layer 106 in FIG. 1)

The redox compound solution prepared in Part A above (7.8 g) was added to 92.2 g of a 35 percent by weight aqueous dispersion of a polyurethane latex of the type described in U.S. Pat. No. 7,342,068 and the mixture was homogenized on a roll mill. The resultant mixture was coated on to a poly(ethylene terephthalate) (PET) film base of 4 mil thickness bearing a coating of indium tin oxide (ITO) to give a wet thickness of approximately 100 μm and the coating was air dried at 140° F. (60° C.).

Part C: Preparation of a Lamination Layer (Corresponding to Layer 110 in FIG. 1)

The redox compound solution prepared in Part A above (1.4 g) was added to 78.6 g of an 8% solution in isopropanol of a polyurethane of the type described in U.S. Pat. No. 7,342,068. The solution thus prepared was coated on to a metalized release sheet to produce a wet layer with a thickness of approximately 80 μm and air dried at 25° C. giving a final thickness of approximately 5 μm.

Part D: Preparation of Displays (as Illustrated in FIG. 1)

The dried film prepared in Part B above was laminated using a hot roll laminator at 250° F., 0.5 ft/minute and 62 psi (121° C., 2.5 mm/sec and approximately 0.45 MPa) to a coating of microcapsules containing an electrophoretic fluid on a release film prepared as described in U.S. Pat. No. 7,561,324. The release film was removed and the resultant assembly was laminated, together with the film prepared in Part C above, using the same laminator at 200° F., 0.5 ft/minute and 62 psi. (93° C., 2.5 mm/sec and approximately 0.45 MPa) The metalized release sheet was then removed and the resultant structure was laminated either to a sheet of PET bearing a conductive carbon coating or to a sheet of glass bearing an ITO coating (to form the electrode 112 and rear substrate 114 shown in FIG. 1) to form the experimental displays. These displays were conditioned at 50° C./50% relative humidity (RH) for 5 days.

The experimental displays thus made with ITO/glass backplanes were compared with similar displays lacking the redox compounds used in the present invention. The displays were driven with repeated iterations of the DC-imbalanced and DC-balanced waveforms shown in Table 1 below for many hours, after which the open circuit voltage was measured by applying +1 V across the sample's terminals and measuring the current, then applying −1 V and again measuring the current. Linear interpolation between the two current measurements was used to find the voltage at which the current would have been zero and this voltage was reported as the open circuit voltage. To reduce the measurement of capacitive effects, the voltages were applied for 1 second but the average current was measured only over the last 200 ms of this period.

TABLE 1

| Time (sec) | Duration (sec) | Voltage (imbalanced) | Voltage (balanced) |
|---|---|---|---|
| 0 | 0.24 | −15 | 15 |
| 0.24 | 1.00 | 0 | 0 |
| 1.24 | 0.24 | 15 | 15 |
| 1.48 | 1.00 | 0 | 0 |
| 2.48 | 0.24 | 15 | 15 |
| 2.72 | 0.11 | 0 | 0 |
| 2.83 | 0.24 | 15 | 15 |
| 3.07 | 0.11 | 0 | 0 |
| 3.18 | 0.24 | 15 | 15 |
| 3.42 | 0.11 | 0 | 0 |
| 3.53 | 0.24 | 15 | 15 |
| 3.77 | 0.11 | 0 | 0 |
| 3.88 | 0.24 | 15 | 15 |
| 4.12 | 0.11 | 0 | 0 |
| 4.23 | 0.24 | 15 | 15 |
| 4.47 | 0.11 | 0 | 0 |
| 4.58 | 0.24 | −15 | 15 |
| 4.82 | 0.11 | 0 | 0 |
| 4.93 | 0.24 | 15 | 15 |
| 5.17 | 0.11 | 0 | 0 |
| 5.28 | 0.24 | −15 | 15 |
| 5.52 | 0.11 | 0 | 0 |
| 5.63 | 0.24 | 15 | 15 |
| 5.87 | 0.11 | 0 | 0 |
| 5.98 | 0.24 | −15 | 15 |
| 6.22 | 0.11 | 0 | 0 |
| 6.33 | 0.24 | 15 | 15 |
| 6.57 | 0.11 | 0 | 0 |

Figure 4:
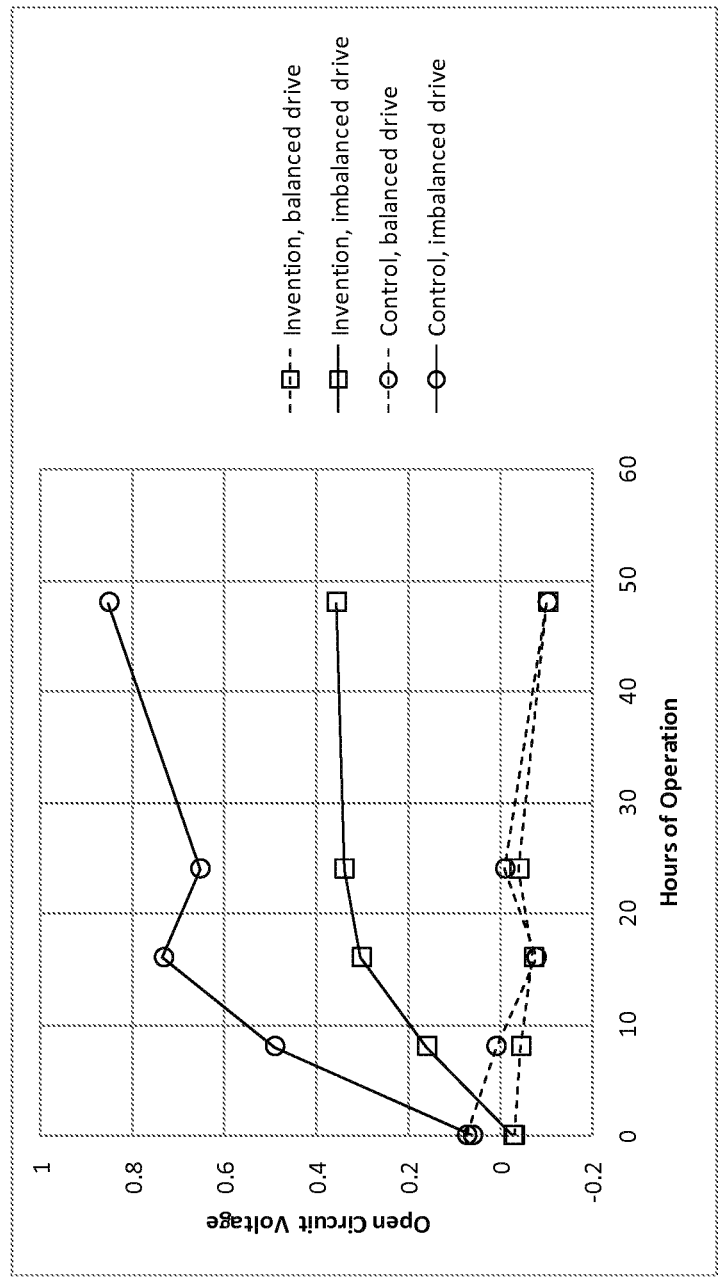
FIG. 4 is a graph showing the open circuit voltage ("remnant voltage") following DC-balanced and DC-imbalanced driving for electrophoretic displays of the present invention and prior art control displays.

FIG. 4 shows the open circuit voltages for a display comprising the redox compounds as compared with a control lacking these compounds. Both displays, when driven with a DC-balanced waveform, exhibited only small changes in the measured open-circuit voltage. The display of the invention exhibited less than half the open-circuit voltage build-up of the control display after prolonged driving with the DC-imbalanced waveform.

Figure 5:
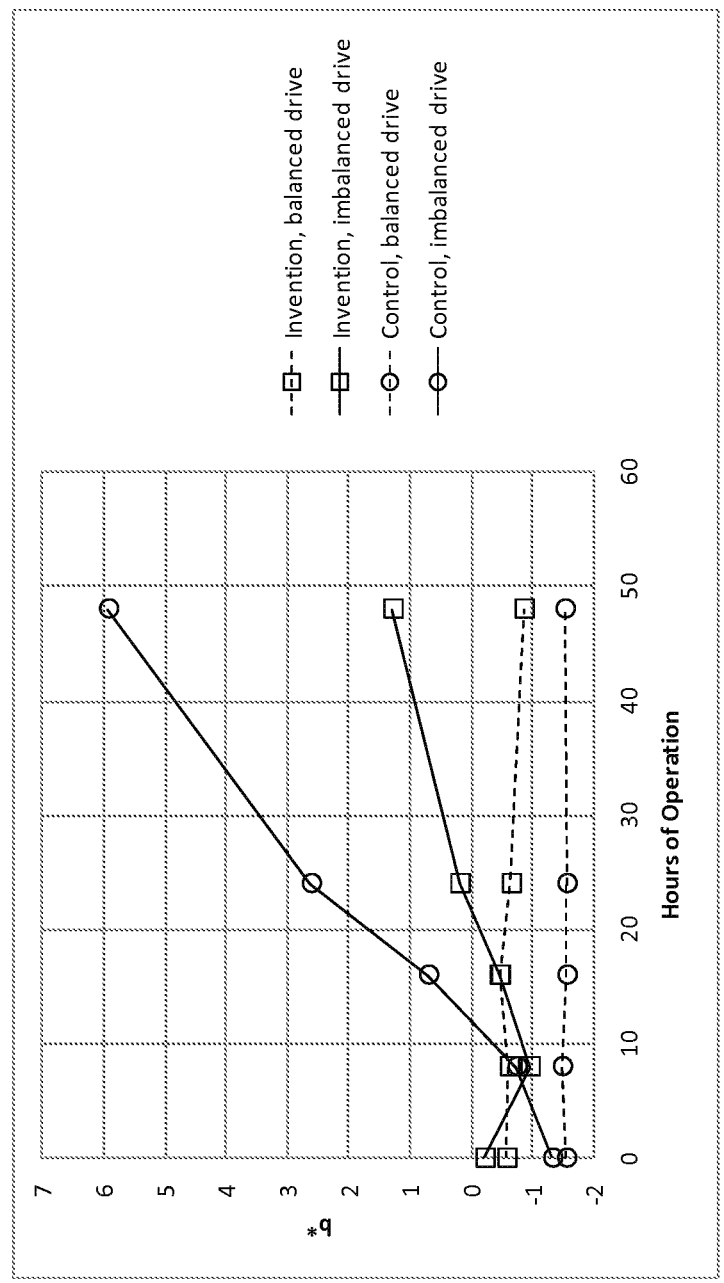
FIG. 5 is a graph shows the electrode degradation, as indicated by yellowing, for the same series of experiments as FIG. 4.

FIG. 5 shows the b* value of the white state of the displays driven as described above. As is well known in the art, the b* value in the conventional CIE L*a*b* color space is a measure of the yellowness of a sample. The development of a yellow color in an ITO electrode is known to correlate with irreversible reduction of the ITO. Both displays, when driven with a DC-balanced waveform, exhibited only small changes in the measured b* value of the white state.

The display of the invention exhibited about one fifth of the change in b* of the control display after prolonged driving with the DC-imbalanced waveform.

Example 2

This Example illustrates the improved stability of white and dark states following a DC-imbalanced drive achieved by a display of the present invention as compared with a control lacking the redox compounds.

Experimental displays produced in Example 1 above with PET/carbon backplanes were compared with similar control displays lacking the redox compounds. The displays were driven to the white state in a highly imbalanced manner by applying the following waveform: three iterations of ten 250 ms pulses of +15 V (top plane) each, separated by 1 second at 0 V, with 5 seconds at 0 V after the tenth pulse, followed by 25 seconds at 0 V. The difference between the white state measured at the end of the final 15 V pulse and that measured at the end of the whole waveform was recorded. Similarly, the displays were driven to the dark state with the same waveform except with −15 V pulses and the difference between the dark state measured at the end of the final −15 V pulse and that measured at the end of the whole waveform was recorded. The results are shown in Table 2 below.

TABLE 2

|  | White State change (L*) | Dark State change (L*) |
|---|---|---|
| Invention | −4.5 | 3.6 |
| Control | −11.8 | 11.2 |

From Table 2, it will be seen that the display of the present invention produced changes in both white and dark states which were much lower than those of the control display, this illustrating the reduced polarization of the display produced by the DC imbalanced waveform.

From the foregoing, it will be seen that the addition of redox compounds to electro-optic displays in accordance with the present invention can provide substantially reduced remnant voltages are protection against electrochemical degradation of electrodes.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electro-optic display having a viewing surface through which a user views the display, a bistable, non-electrochromic electro-optic medium, and at least one electrode arranged to apply an electric field to the electro-optic medium, the display further comprising at least 10 micromoles per square meter of the viewing surface of at least one compound having an oxidation potential more negative that about 150 mV with respect to a standard hydrogen electrode, as measured at pH 8, wherein the compound having the oxidation potential comprises one or more compounds of Formulae I below:

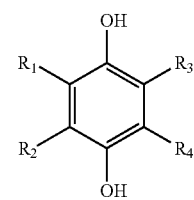

wherein, in Formulae I, $R_1$-$R_4$ may be substituted or unsubstituted alkyl or aryl groups, or heteroatomic groups containing hetero atoms of Groups V-VII of the periodic table, and substituents $R_1$ and $R_2$ (taken together), and/or $R_3$ and $R_4$, may form a ring.

2. A display according to claim 1 wherein the electro-optic medium is one which requires charge injection from the electrode.

3. A display according to claim 1 wherein the compound having the oxidation potential is in the form of a polymer provided in a layer disposed between the electrodes and the layer of electro-optic material.

4. A display according to claim 1 wherein the compound having the oxidation potential comprises any one or more of tetramethylhydroquinone, trimethylhydroquinone, and 2,4- and 2,5-di-tert-butyl hydroquinone.

5. A display according to claim 1 wherein the compound having the oxidation potential comprises ascorbic acid or a cathechol.

6. A display according to claim 1 wherein the compound having the oxidation potential comprises phenidone or 5-mercapto-1-methyltetrazole.

7. A display according to claim 1, wherein the compound having the oxidation potential has a reduction potential (of the oxidized form) that is not greater than 1.0 V relative to a standard hydrogen electrode.

8. A display according to claim 1 wherein the compound having the oxidation potential has a molecular weight not exceeding about 1000 Daltons.

9. A display according to claim 1 wherein the compound having the oxidation potential has a reduction potential that is not greater than 0.2 V relative to a standard hydrogen electrode, contains at least one carbon atom, and has a molecular weight not exceeding about 1000 Daltons.

10. A display according to claim 1 comprising a first compound having an oxidation potential added in its oxidized form and a second compound having an oxidation potential added in its reduced form, the standard reduction potential of the oxidized form of the first compound being less positive than that of the oxidized form of the second compound.

11. A display according to claim 1 where in the electro-optic medium is an electrophoretic medium comprising a fluid and a plurality of electrically charged particles dispersed in the fluid.

12. An electronic book reader, portable computer, tablet computer, cellular telephone, smart card, sign, watch, shelf label, variable transmission window or flash drive comprising a display according to claim 1.

13. A display according to claim 11 wherein the electrically charged particles and the fluid are confined within a plurality of capsules or microcells.

14. A display according to claim 11 wherein the electrically charged particles and the fluid are present as a plurality of discrete droplets surrounded by a continuous phase comprising a polymeric material.

15. A front plane laminate comprising in order:
a light-transmissive electrically-conductive layer;
a layer of a solid electro-optic medium in electrical contact with the electrically-conductive layer;
an adhesive layer; and
a release sheet,
the front plane laminate further comprising at least 10 micromoles per square meter of the layer of solid electro-optic medium of at least one compound having an oxidation potential more negative that about 150 mV with respect to a standard hydrogen electrode, as measured at pH 8, wherein the compound having the oxidation potential comprises one or more compounds of Formulae I below:

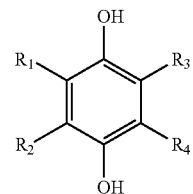

wherein, in Formulae I, $R_1$-$R_4$ may be substituted or unsubstituted alkyl or aryl groups, or heteroatomic groups containing hetero atoms of Groups V-VII of the periodic table, and substituents $R_1$ and $R_2$ (taken together), and/or $R_3$ and $R_4$, may form a ring.

16. An inverted front plane laminate comprising, in order:
at least one of a light-transmissive protective layer and a light-transmissive electrically-conductive layer;
an adhesive layer;
a layer of a solid electro-optic medium; and
a release sheet,
the inverted front plane laminate further comprising at least 10 micromoles per square meter of the layer of solid electro-optic medium of at least one compound having an oxidation potential more negative that about 150 mV with respect to a standard hydrogen electrode, as measured at pH 8, wherein the compound having the oxidation potential comprises one or more compounds of Formulae I below:

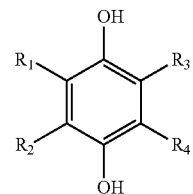

wherein, in Formulae I, $R_1$-$R_4$ may be substituted or unsubstituted alkyl or aryl groups, or heteroatomic groups containing hetero atoms of Groups V-VII of the periodic table, and substituents $R_1$ and $R_2$ (taken together), and/or $R_3$ and $R_4$, may form a ring.

* * * * *